United States Patent [19]

Pepp

[11] Patent Number: 5,247,897
[45] Date of Patent: Sep. 28, 1993

[54] JACKETED CUSHIONING DEVICE AND METHOD OF MANUFACTURE

[76] Inventor: Dudley H. Pepp, 612 N. Alta Dr., Beverly Hills, Calif. 90210

[21] Appl. No.: 711,619

[22] Filed: Jun. 5, 1991

[51] Int. Cl.⁵ .............................................. B63B 59/02
[52] U.S. Cl. ................................................... 114/219
[58] Field of Search .................... 114/219, 357; 441/1, 441/35, 131, 132, 136; 405/212; D12/168; 293/102, 109, 120, 122

[56] References Cited

U.S. PATENT DOCUMENTS

| | | | |
|---|---|---|---|
| 2,577,236 | 12/1951 | Doherty | 114/219 |
| 2,848,725 | 8/1958 | Sloulin | 9/3 |
| 2,940,414 | 6/1960 | Moore | 114/219 |
| 3,109,405 | 11/1963 | Nusinoff | 114/219 |
| 3,179,397 | 4/1965 | Cleereman et al. | 267/1 |
| 3,411,304 | 11/1968 | Miller | 61/48 |
| 3,881,439 | 5/1975 | Svanholm | 441/1 |
| 4,579,344 | 4/1986 | Meggs | 273/127 B |
| 4,893,576 | 1/1990 | Day et al. | 114/219 |

FOREIGN PATENT DOCUMENTS 551153 2/1943 United Kingdom .

*Primary Examiner*—David M. Mitchell
*Assistant Examiner*—Stephen P. Avila
*Attorney, Agent, or Firm*—Pretty, Schroeder, Brueggemann & Clark

[57] ABSTRACT

A cushioning device comprises a resilient foam material surrounded by a seamless, woven jacket that is gathered along opposed sides and stitched so that the gathered jacket forms attachment flanges that serve as means to fasten the cushioning device to a pier, loading dock, wall, or the like. The cushioning device is produced by inserting the foam center section down a woven jacket made from polyester, nylon, "NOMEX", "KEVLAR", or similar abrasion-resistant materials, the jacket having an internal diameter greater than the circumference of the foam center section. The excess jacket is gathered into flat portions that are stitched together to form the attachment flanges.

8 Claims, 1 Drawing Sheet

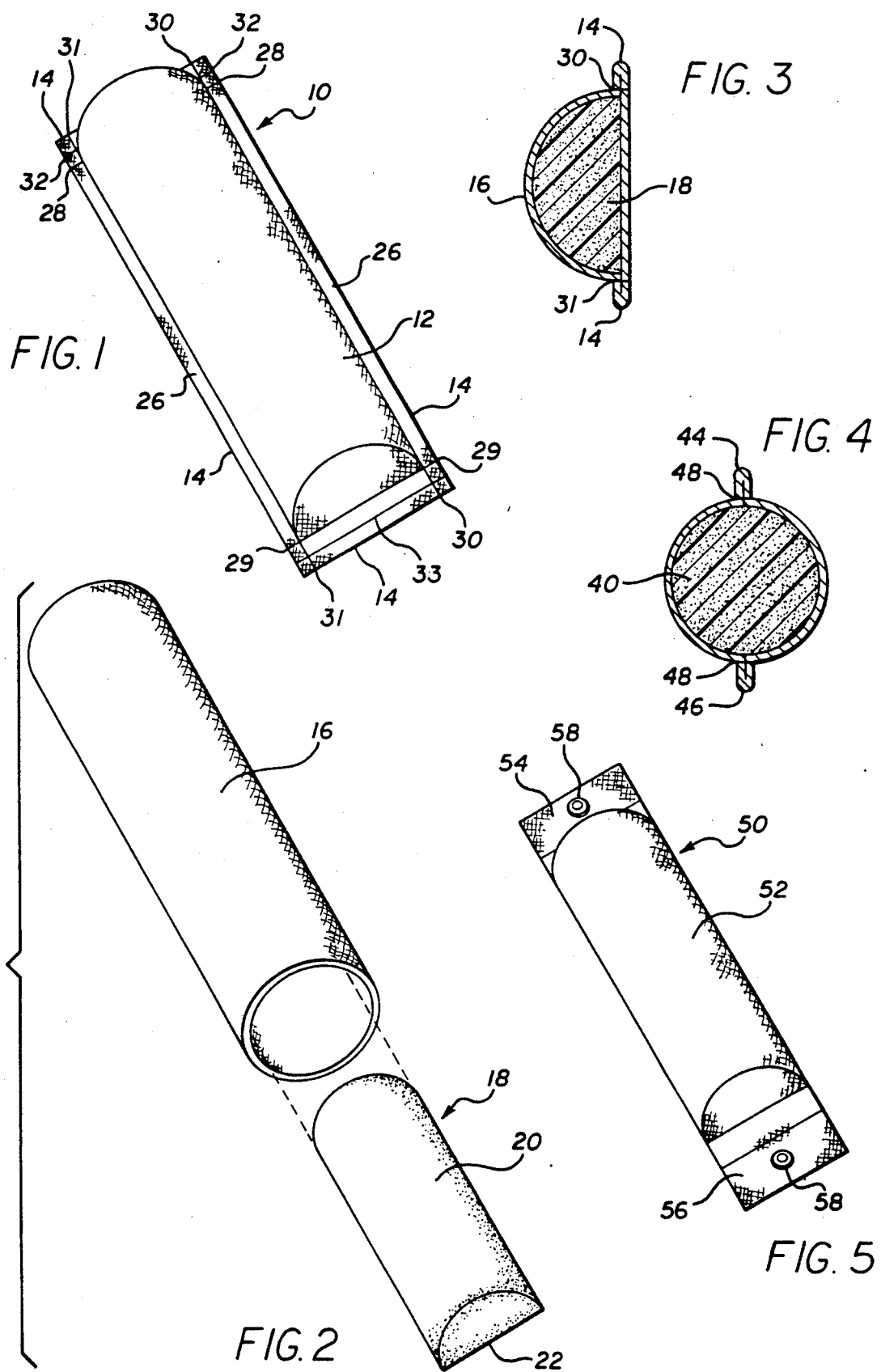

JACKETED CUSHIONING DEVICE AND METHOD OF MANUFACTURE

BACKGROUND OF THE INVENTION

1. Field of the Invention

This invention relates to cushioning devices and, more particularly, to a jacketed cushioning device and a method of providing a jacketed cushioning device that is easily constructed and used.

2. Description of the Related Art

Cushioning devices are used to protect a structure from damaging impact with another object by absorbing the forces of the impact. For example, piers and boat docks are presently provided with various types of cushioning devices to protect boats against damaging impact with the piers and docks. One conventional boat dock cushioning device consists of extruded, relatively flat strips of white-colored rubber, vinyl, or the like. The strips are nailed or stapled in place on strategic areas of the pier or dock where contact with boats is likely to occur.

While such rubber strips will absorb some of the impact forces from boats, they also can rub off onto the boats and mar them. Such marring occurs due to deterioration of the rubber strips from exposure to the environment. In addition, the nails or staples that are used to attach the extruded rubber must be pushed through the front impact surface of the rubber into the pier or dock. As boats make contact with the rubber strip, the nails or staples can work loose, scratching the boats.

Other cushioning devices are fashioned from old tires that are cut into strips and nailed to piers, loading docks, parking garage walls, and the like, but the old tires are usually rather unsightly and the nails can likewise work loose from impacts and cause scratching. As another alternative, a foam strip can be wrapped with carpeting or other textile material, which is then attached to the pier or dock by nailing or stapling. While this alternative construction can absorb much of the force of an impact and will not mar the vessels or vehicles involved, the device can be difficult to attach and can easily fray and become torn. The foam material also typically loses much of its resiliency at low temperatures. Also, the carpeting is not particularly strong and is not necessarily abrasion resistant. Furthermore, the carpeting can easily fray from the back and forth motion of the carpeting against the fastening nails as impacts occur. The fraying hastens the deterioration of the carpeting. Finally, the impacts can again cause the fastening nails to work loose and cause scratching or even cause the foam strip to fall away.

Prefabricated cushioning devices have been provided that have a somewhat similar structure to the foam center covered by carpeting. Such cushioning devices can comprise, for example, two flat strips of textile fabric that are sewn or heat sealed together around their edges to enclose a foam center section. Cushioning devices with this type of construction are described in U.S. Pat. No. 3,109,405 to Musinoff and U.S. Pat. No. 3,179,397 to Cleereman et al. Such cushioning devices absorb much of the force from impacts and are much easier to install than carpet-covered foam strips. Some such devices, however, are not made from materials that are sufficiently durable to provide a long service life. For example, the textile might be comprised of a cotton canvas, which can quickly deteriorate. Furthermore, the seam where the front and back textile portions are sewn or heat sealed together provides an open, somewhat frayed edge to begin with. That is, the continuity of the enclosing cover is broken from the start by the seam line. This break in the textile makes it easier for the deterioration process to cause the same type of fraying encountered with carpet-covered foam sections. Also, careful alignment is necessary between the two textile strips and the foam center.

From the discussion above, it should be apparent that there is a need for a cushioning device that does not mar the vehicles and/or vessels with which it comes in contact and that is durable, provides ample cushioning protection, is easy to attach, and is relatively inexpensive to manufacture. The present invention satisfies this need.

SUMMARY OF THE INVENTION

The present invention provides a cushioning device having an impact absorbing center material surrounded by a tubular jacket that is made from an abrasion-resistant material and is provided with integral attachment flanges that are formed by gathering an excess portion of the tubular jacket. In particular, the jacket comprises a woven fabric, cylindrical-shaped jacket with an inside diameter that is sufficient to completely envelope the center material. The center material comprises a resilient foam that has memory such that after an impact it tends to regain its initial shape. The device is constructed by inserting the resilient foam center material into the open jacket, gathering the jacket from around the center material into two outwardly projecting, opposed portions, and sewing or otherwise fastening together the gathered portions to create the attachment flanges.

The tubular jacket simplifies the manufacturing process and therefore provides a relatively low-cost structure because there is no need to align two separate front and back pieces around a center foam section. The flanges can be used easily to attach the cushioning device to piers, docks, walls, and the like with nails, staples, or screws. Also, one of the flanges can be attached in such a way that the cushion portion of the device can be folded over on the flange, thus concealing the nails, staples, or screws. This method of attachment keeps the nails, staples, and screws away from the cushioning device's impact area and reduces the chance of scratching a boat or car. Because the jacket has a woven construction, it presents a continuous surface to the environment and better resists fraying and deterioration, even with prolonged use. Because the jacket material is abrasion resistant and is not subject to deterioration from the elements, it will not mar boats or cars.

In one aspect of the invention, the woven jacket comprises a polyester material. The material used for reinforcement jackets is especially resistant to abrasion and deterioration from harsh environments. The resilient foam center section can comprise any one of several plastic foam materials known to those skilled in the art. The gathered portions of the jacket can advantageously be sewn to form the flanges. The cushioning device also can be suspended by a flange eyelet at a location as needed and moved from place to place.

Other features and advantages of the present invention should be apparent from the following description of the preferred embodiments, taken in conjunction with the accompanying drawings, which illustrate, by way of example, the principles of the invention.

BRIEF DESCRIPTION OF THE DRAWINGS

FIG. 1 is a perspective view of a jacketed cushioning device in accordance with the invention.

FIG. 2 is an exploded perspective view of the tubular jacket and center section of the FIG. 1 cushioning device, prior to assembly.

FIG. 3 is a cross-sectional view of the FIG. 1 cushioning device.

FIG. 4 is a cross-sectional view of a second embodiment of a cushioning device constructed in accordance with the present invention.

FIG. 5 is a perspective view of an alternate embodiment of a cushioning device in accordance with the present invention that is adapted to be transportable.

DESCRIPTION OF THE PREFERRED EMBODIMENTS

The cushioning device 10 illustrated in FIG. 1 is constructed in accordance with the present invention and includes a semi-circular impact absorbing center section 12 that is surrounded by a flat attachment flange 14. The attachment flange is used to attach the cushioning device to piers, docks, garage walls, and the like. The attachment flange 14 provides a convenient means of fastening the cushioning device to a boat pier or freight loading dock, for example, by driving nails, staples, or screws through the flange into the pier or dock. The flange also keeps the nails or staples away from the impact absorbing center section 12, reducing the chance of scratching. The flange also can be wrapped around a corner of the pier or dock and fastened at the side, further reducing the chance of scratching.

The constituent parts of the cushioning device 10 are shown in FIG. 2, which shows a woven, tubular jacket 16 about to receive an elongated, semicircular cylinder 18 of an energy-absorbing plastic foam material. After the foam cylinder 18 is inserted into the jacket 16, the sides and ends of the jacket are gathered and fixed in place by sewing them together flat, creating the flange 14. Inserting the foam cylinder into the jacket and gathering the jacket into the flange is an easy process that simplifies the production of the cushioning device. Thus, it isn't necessary to position two separate front and back portions.

The foam cylinder 18 includes a curved front surface 20 and a flat back surface 22. The foam cylinder 18 is resilient and has a memory such that after an impact it tends to return to its original shape. The jacket 16 has a length sufficiently longer than the length of the foam cylinder 18 that, after the foam cylinder is inserted into the jacket, the ends of the jacket can be gathered into flat portions 14. The diameter of the jacket is sufficient to allow the jacket to be gathered into flat portions that project outwardly along the length of the foam cylinder 18 where the front curved surface 20 meets the flat back surface 22. The gathered jacket is then sewn together along two end stitch lines 28 and 29 that extend across the jacket at each end of the foam cylinder, and also along two stitch lines 30 and 31 that extend along the length of the jacket, to form the attachment flange 14. The jacket is woven and therefore presents a continuous surface to the environment, with no cut or broken seam line extending completely around its circumference that might promote fraying. The ends of the jacket, however, are necessarily cut and, for additional fray resistance, the jacket is sewn along a second pair of stitch lines 32, 33 parallel to the first pair of end stitch lines 28, 29 but closer to the ends of the jacket.

The FIG. 3 cross-sectional view shows that the stitched jacket 16 provides a seamless covering around the entire foam cylinder 18. The flat attachment flange 14 provides an easy means of attaching the cushioning device 10 to a surface such as a pier, a loading dock, a garage wall, or the like. The fabric is abrasion-resistant and is preferably constructed from polyester, nylon, "NOMEX", "KEVLAR", or a similar material. The inventor has found that a woven fabric such as a fire hose reinforcement jacket is especially suited to this application.

A suitable reinforcement jacket, for example, has an outside diameter of approximately 3.60 inches and an inside diameter of 3.45 inches. Such reinforcement jackets are of heavy construction and have a weight of approximately 29.375 pounds per one hundred length. Such jackets come in a wide variety of lengths, typically from 6 inches to 40 feet in length. Plastic foam is readily available in an equally wide variety of lengths. Cushioning devices can be easily constructed in accordance with the invention in lengths from 6 inches to 100 feet or more, but the inventor herein has found that 9-foot lengths are especially suitable for use on boat docks. In the illustrated embodiment, the foam cylinder 18 has a radius of 1.50 inches. The inventor has found that the gathered jacket can be sewn together conveniently with a #23 needle on a conventional single-needle, walking foot, heavy-duty industrial sewing machine. The thread used is preferably compatible with the jacket material, such as high-strength polyester/nylon thread. The reinforcement jackets are totally mildew-resistant and will not lose their tensile strength due to the effects of mildew. This makes them especially suitable for use in the marine environment.

A variety of geometries can be used for the impact absorbing center section. For example, FIG. 4 is a cross-sectional view of a cushioning device in accordance with the present invention wherein the center section 40 is an elongated cylinder surrounded by a woven, seamless jacket 42. As with the jacket illustrated in FIGS. 1–3, the FIG. 4 jacket has a diameter sufficiently greater than the diameter of the center section 40 that the jacket can be gathered into opposed attachment flanges 44 and 46. The gathered portions can be fixed together by stitching 48 that runs along the length of the cylinder 40. The ends can be finished in the fashion illustrated in FIG. 1, the details of which will be clear to those skilled in the art.

The attachment flange 14 pictured in FIG. 1 and 3 need not extend completely around the impact absorbing center section 12. FIG. 5 is a perspective view of an alternate embodiment of the present invention in which a cushioning device 50 is provided with an impact absorbing center section 52 having an upper attachment flange 54 and a lower attachment flange 56. The cushioning device is formed by inserting a foam cylinder within a tubular jacket, in the manner illustrated in FIG. 2. In the FIG. 5 device, however, the diameter of the foam cylinder is selected to be only slightly less than the inside diameter of the jacket. Thus, there will be no excess jacket material that can be gathered into side attachment flanges along the length of the foam cylinder. The length of the foam cylinder, however, is still selected to be less than the length of the jacket. Therefore, the ends of the jacket can be gathered into flat attachment flanges and sewn across the jacket, in a manner similar to that shown in FIG. 1. Finally, a brass or stainless steel eyelet 58 can be placed in one or both of the attachment flanges 54 and 56. This allows the cushioning device 50 to be moved about and transported to where it is needed. For example, a rope can be passed through the eyelet 58 and the cushioning device can be suspended over the side of a boat to act as a fender. A boat fender made in this manner is easily constructed, provides a superior service life when compared with many conventional boat fenders, and will not mar the boat.

In either of the embodiments illustrated, the cushioning device includes a seamless, abrasion-resistant jacket. The cushioning device is relatively easy to construct and provides superior durability and improved performance when compared with conventional do-it-yourself cushioning devices and conventional prefabricated devices. The seamless jacket resists fraying and helps the cushioning device resist deterioration from exposure to the environment and absorption of impacts. The resistance to fraying improves the performance of the cushioning device, and the device is less likely to become detached or damage the cushioned vehicle with scratching by fastening nails or the like. These features result in a greatly improved service life when compared with other cushioning devices. The method of constructing such cushioning devices advantageously accommodates a wide variety of center section shapes.

The present invention has been described above in terms of presently preferred embodiments so that an understanding of the present invention can be conveyed. There are, however, many configurations for cushioning devices and methods of constructing them that are not specifically described herein, but with which the present invention is applicable. The present invention should therefore not be seen as limited to the particular embodiments described herein, but rather, it should be understood that the present invention has applicability with respect to a variety of cushioning devices. All modifications, variations, or equivalent arrangements that are within the scope of the attached claims should therefore be considered to be within the scope of the invention.

I claim:

1. A method of producing a cushioning device, comprising the steps of:
   providing an elongated, resilient foam material that has a first end, a second end a shape memory;
   providing a flexible, seamless, tubular member made from an abrasion resistant, textile fabric, said tubular member having an opening therethrough, a first end portion defining the periphery of one end of the opening, a second end portion defining the periphery of the other end of the opening and an intermediate portion defining the periphery of the opening between the first and second end portions, said tubular member further having a length and an internal diameter that are sufficient to completely envelope the resilient foam material;
   inserting the resilient foam material into the opening of the seamless tubular member to the intermediate portion of the seamless tubular member;
   gathering the first and second end portions of the seamless tubular member so as to form two opposed end flanges that project outwardly from each end of the foam material;
   gathering first and second lengthwise extending portions of the seamless tubular member along the entire length of the tubular member so as to form two opposed lengthwise extending flanges; and
   fixing the gathered end portions and lengthwise extending portions of the tubular member into the end flanges, and the lengthwise extending flanges.

2. The method defined in claim 1, wherein the step of providing a seamless tubular member comprises providing a tubular member woven from the abrasion-resistant fabric, and wherein the step of fixing the gathered tubular member comprises stitching the formed flanges together.

3. A method as defined in claim 2, wherein the step of fixing the gathered tubular member into flanges includes the step of providing an eyelet through at least one flange.

4. A method as defined in claim 1, wherein at least one lengthwise extending flange retains its flexibility after the gathered lengthwise extending portions of the tubular member have been fixed.

5. The method defined in claim 1, wherein the step of providing an elongated, resilient foam material comprises providing a resilient foam material with a semi-circular shape having a flat side.

6. A method of producing a cushioning device, comprising the steps of:
   providing an elongated, generally cylindrical, resilient foam material having a semi-circular shape with a curved front face and a substantially flat back face;
   providing a flexible, seamless tubular member having a first end portion, a second end portion, an intermediate portion between the first and second end portions and an interior diameter that is sufficient to completely envelope the foam material and a length that is greater than the length of the foam material, the tubular member being constructed from an abrasion-resistant, woven textile, fabric;
   inserting the foam material into the interior of the seamless tubular member to the intermediate portion between the first and second end portions of the tubular member;
   gathering the seamless tubular member along its periphery so as to form a continuous flange that projects outwardly, parallel to the foam material's planar back face; and
   stitching the gathered tubular member together, completely around the planar back face of the foam material.

7. A cushioning device comprising:
   an elongated resilient foam material having two ends and a shape memory;
   a flexible, seamless, abrasion resistant, woven textile fabric, tubular member having a first end portion, a second end portion, a first lengthwise extending portion that extends between the first and second end portions, a second lengthwise extending portion opposed to the first lengthwise extending portion, and an intermediate portion disposed between the end portions and between the lengthwise extending portions, said intermediate portion having a length and an internal diameter sufficient to completely envelope the resilient foam material;
   said resilient foam material located within the intermediate portion of the tubular member;
   said first and second end portions forming opposed end flanges that project outwardly from each end of the foam material, wherein the end flanges comprise gathered portions of the woven tubular member that are held in a flat shape; and said first and second lengthwise extending portions forming two opposed lengthwise extending flanges that project outwardly from the foam material between each end of the foam material, wherein the lengthwise extending flanges comprise gathered portions of the woven tubular member that are held in a flat shape.

8. A cushioning device as defined in claim 7, wherein the gathered portion of the jacket is held in a flat shape by stitching.

* * * * *